E. MAURICE.
COMBINED CYCLE STAND AND LOCK.
APPLICATION FILED DEC. 21, 1920.
1,385,020.
Patented July 19, 1921.
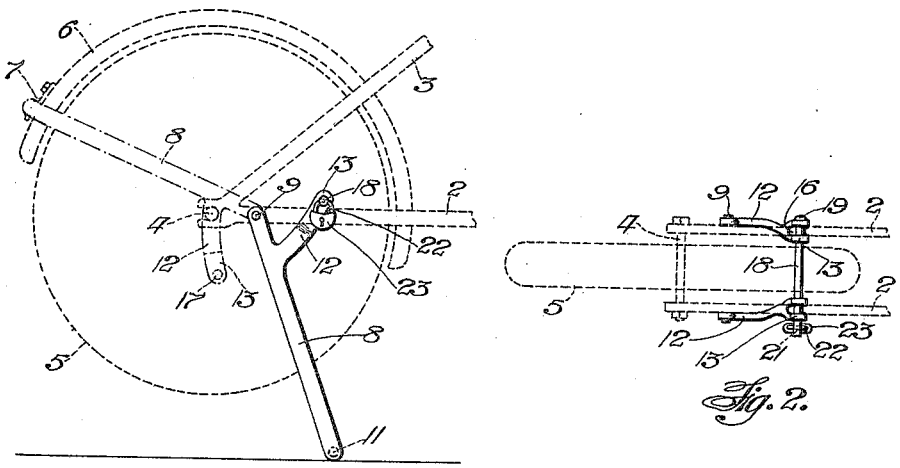
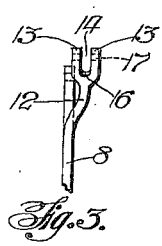
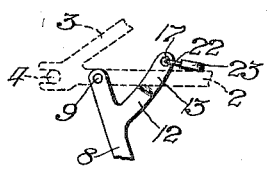
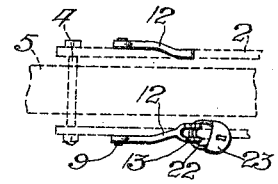
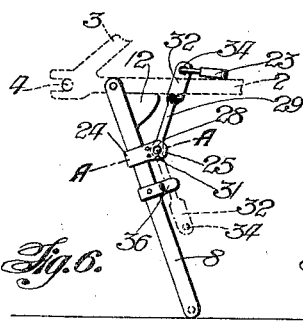
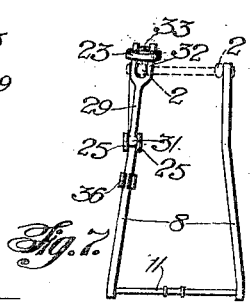
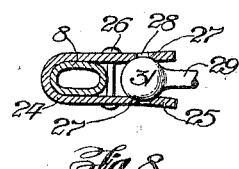
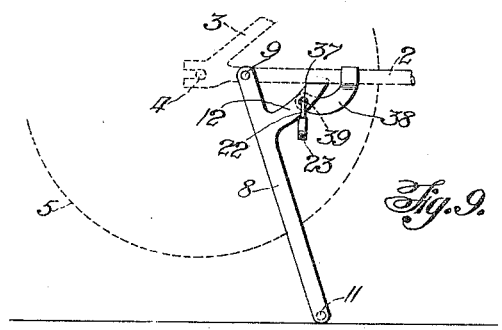
Inventor:
Edward Maurice

UNITED STATES PATENT OFFICE.

EDWARD MAURICE, OF MELBOURNE, VICTORIA, AUSTRALIA.

COMBINED CYCLE STAND AND LOCK.

1,385,020.  Specification of Letters Patent.  Patented July 19, 1921.

Application filed December 21, 1920. Serial No. 432,263.

*To all whom it may concern:*

Be it known that I, EDWARD MAURICE, a subject of the King of Great Britain and Ireland, and a resident of the city of Melbourne, in the county of Bourke, State of Victoria, Commonwealth of Australia, have invented certain new and useful Improvements in and Connected with Combined Cycle Stands and Locks, of which the following is a specification.

This invention relates to means for locking a cycle particularly a motor cycle in such a manner that it is impossible for an unauthorized person to use or wheel away the machine from the place where it is left standing by its owner or rider.

The object of the invention is to provide an extremely simple and effective device whereby the stand commonly associated with the back wheel of motor cycles to support the machine when not in use may be locked in its downward or operative position so that the cycle cannot be moved until the stand has been unlocked by a key possessed by an authorized person.

It will be evident from the following description that the particular means employed in carrying the invention into effect may vary considerably the description and drawings being directed particularly to several preferred embodiments of particularly convenient construction. It is therefore intended and desired that such embodiments should be construed as illustrative examples rather than in a limiting sense in interpreting the appended claims.

Referring to the drawings which form part of this specification:—

Figure 1 is a side elevation showing one form of the invention in use. The cycle stand and other parts directly concerned in the invention are shown in full lines while the cycle frame, wheel and mudguard are shown in dotted lines. In dot and dash lines the stand is shown hinged up into its inoperative position.

Fig. 2 is a plan of the embodiment seen in Fig. 1.

Fig. 3 is a front view of the upper part of one side of the cycle stand seen in Figs. 1 and 2.

Fig. 4 is a side view showing another method of carrying out the invention.

Fig. 5 is a plan of Fig. 4.

Fig. 6 is a side view of a modification.

Fig. 7 is a front view of Fig. 6.

Fig. 8 is an enlarged section on line A—A Fig. 6.

Fig. 9 shows a still further means of applying the invention.

In the drawings the numeral 2 indicates the horizontal or lower rear fork of a cycle frame and 3 the diagonal rear fork thereof, said forks being mounted on the axle 4 of the rear wheel 5. 6 indicates the rear mudguard which carries the usual spring catch 7 for holding the stand in its upward or inoperative position.

The invention is applied to the conventional form of cycle stand comprising two side members 8 which are hinged at their inner ends by a hinge pin 9 to the cycle frame and are united at their outer ends by a cross member 11 which is engaged with the catch 7 when the stand is hinged upwardly and not in use. The stand is also provided with the usual outstanding rests 12 one of which projects forwardly from each of the side members 8 so that when the stand is swung into its downward or operative position as seen in full lines in Fig. 1 the member 2 of the cycle frame reposes on top of the rest 12.

According to one form of the invention as seen in Figs. 1 to 5 one or both of the outstanding rests 12 is provided with one or more lugs or extensions 13. These lugs are preferably forked as seen in Fig. 3 thereby forming a gullet 14 between the lugs to accommodate the adjoining member 2 of the cycle frame when the stand is in use, said member resting upon the bottom or bed 16 of the gullet.

Formed through the outer ends of the lugs or extensions 13 are opposite transverse holes 17. These holes are adapted to receive a suitable locking element such for instance as the transverse locking pin 18 seen in Figs. 1 and 2, this locking pin extending through the lugs or extensions 13 at each side of the stand and thus passing between the spokes of the rear wheel. The locking pin 18 is provided on one end with a head 19 at its other end with a padlock hole 21 to accommodate the hasp 22 of a padlock 23.

It will thus be seen that when the stand is in its operative position as shown in full lines in Fig. 1 and the locking pin has been passed through the holes 17 of the opposite lugs or extensions 13 above the members 2 of the cycle frame and the hasp of the padlock has been passed through the hole 21 in the locking pin and locked, it is impossible to move the stand or the cycle until the padlock has been unlocked by its proper key in the possession of the owner or rider of the machine.

It will be evident from Figs. 4 and 5 that instead of employing a locking pin 18 the hasp of the padlock may be passed directly through the holes 17 of the extensions or lugs 13 with similar effect. It will furthermore be evident that although preferred it is not essential that the lugs or extensions 13 should be forked as shown as a corresponding single lug or extension only may be provided on one or both of the rests 12 to receive the locking element.

In the modification shown in Figs. 6 to 8 a U shaped socket plate 24 is passed around one or both the side members 8 of the cycle stand and secured thereto by rivets 26. Formed on the inner face of each cheek 25 of the socket plate 24 are opposite part spherical cups or recesses 27 forming a socket to accommodate a ball head hereinafter described. Side openings 28 may be formed through the opposite cheeks of the socket plate as shown.

In combination with the socket plate a universally or loosely jointed arm 29 is employed. This is provided with a ball head 31 which freely fits the socket formed by the recesses 27 thus allowing the arm 29 to be moved freely in any direction, the sideward movement of said arm being limited to a certain extent by the opposite cheeks of the socket plate. The outer end of the arm 29 is provided with opposite forked lugs 32 forming a gullet 33 to accommodate the adjacent member 2 of the cycle frame when the stand is in use. The lugs 32 are also provided with transverse holes 34 to accommodate the locking element which may comprise either the locking pin 18 or the hasp of the padlock.

When the stand is not in use the arm 29 is held against the respective side member 8 of the stand by a spring catch 36 as indicated in dotted lines in Fig. 6. The catch 36 preferably consists of a U shaped strip of spring metal passed around and secured to the side member 8 as shown. With this embodiment of the invention the forked lugs 32 may be moved into different lateral positions to suit the particular disposition of the lower member 2 of the frame in machines of different make.

As shown in Fig. 9 the extensions or lugs on the stand may be dispensed with, the stand remaining unaltered except for the provision of a hole 37 formed through the ordinary rest 12 of the stand. In this case a lug or extension 38 is suitably secured to the member 2 of the cycle frame and is provided with a hole 39 to coöperate with the hole 37 of the stand so that by passing a locking device such as the hasp 23 of the padlock through the holes 37 and 39 the stand will be securely locked in its downward or operative position as aforesaid. The lugs 38 and the holes 37 and 39 may obviously be provided at each side of the machine to accommodate a transverse locking pin as before described.

By thus locking the stand it is obviously not practicable to move the cycle until the padlock has been unlocked by manipulation of its key to release the stand which may then be swung upwardly out of the way in the usual manner.

Having now described my invention what I claim as new and desire to secure by Letters Patent is:—

1. In a combined cycle stand and lock the combination with a stand hinged to the rear portion of the cycle frame and adapted to support the machine when at rest, of an arm pivotally connected at one end to the stand and provided at its other end with forked lugs adapted to accommodate the horizontal or lower rear fork of the machine frame, said lugs having opposite transverse holes to receive a locking element for the purpose specified.

2. In a combined cycle stand and lock the combination with a stand hinged to the rear portion of the cycle frame and adapted to support the machine when at rest, of an arm, a ball and socket joint connecting one end of said arm to the stand and means carried by the other end of said arm and having transverse holes therethrough to accommodate a locking element for the purpose specified.

3. In a combined cycle stand and lock the combination with a stand hinged to the rear portion of the cycle frame and adapted to support the machine when at rest, of an arm, a ball head carried by the inner end of said arm, a U shaped clamping plate attached to the stand and having opposite cheeks provided with opposite part spherical cups or recesses to accommodate said ball head, and opposite forked lugs carried by the outer end of said arm and adapted to accommodate a portion of the machine frame, said lugs being provided with opposite transverse holes for the purpose specified.

4. A combined cycle stand and lock, consisting in the combination with a stand hinged to the rear portion of the cycle frame and adapted to support the machine when at rest, of an arm, a ball and socket joint connecting one end of said arm to the stand, means for locking the other end of said arm to the cycle frame and a spring catch carried by the stand and adapted to hold the arm when the stand is not in use.

5. In a combined cycle stand and lock, a hinged stand adapted to support the machine frame; a pivoted arm adapted to connect the machine frame and the hinged stand and having means to accommodate a locking element for the purpose of maintaining the hinged stand in predetermined position relative to the machine frame; and means for maintaining the pivoted arm in idle position.

6. In a combined cycle stand and lock, a hinged stand adapted to support the machine frame; a pivoted arm adapted to engage both the machine frame and the hinged stand when the latter is in position to support the frame, said frame having means to accommodate a locking element for the purpose of maintaining the hinged stand in position to support the machine frame; and a spring clip adapted to hold the pivoted arm in idle position.

In testimony whereof I affix my signature.

E. MAURICE.

Witness:
CECIL W. LE PASTEUR.